INVENTORS
FREDERICK H. N. CARTER
SVEN M. J. OLSSON
BY WILLIAM V. MARTINSON
Burgess, Ryan, & Hicks
ATTORNEYS

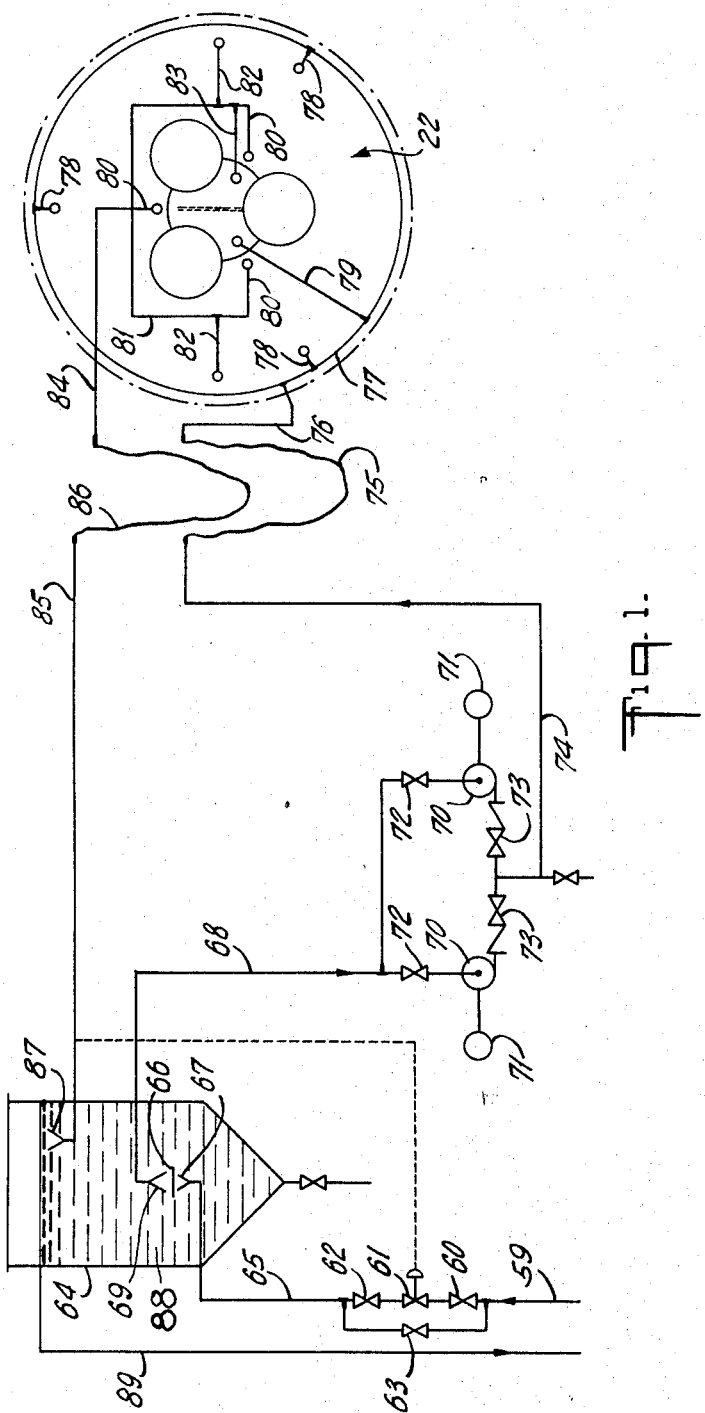

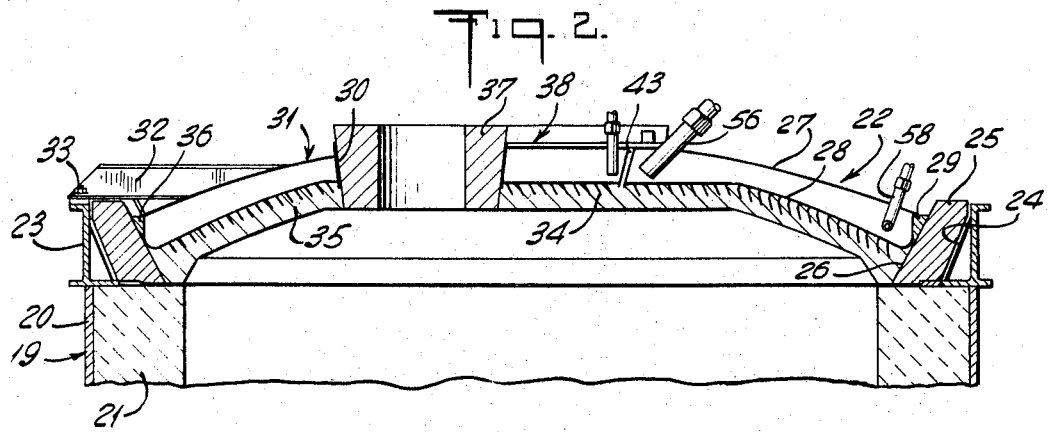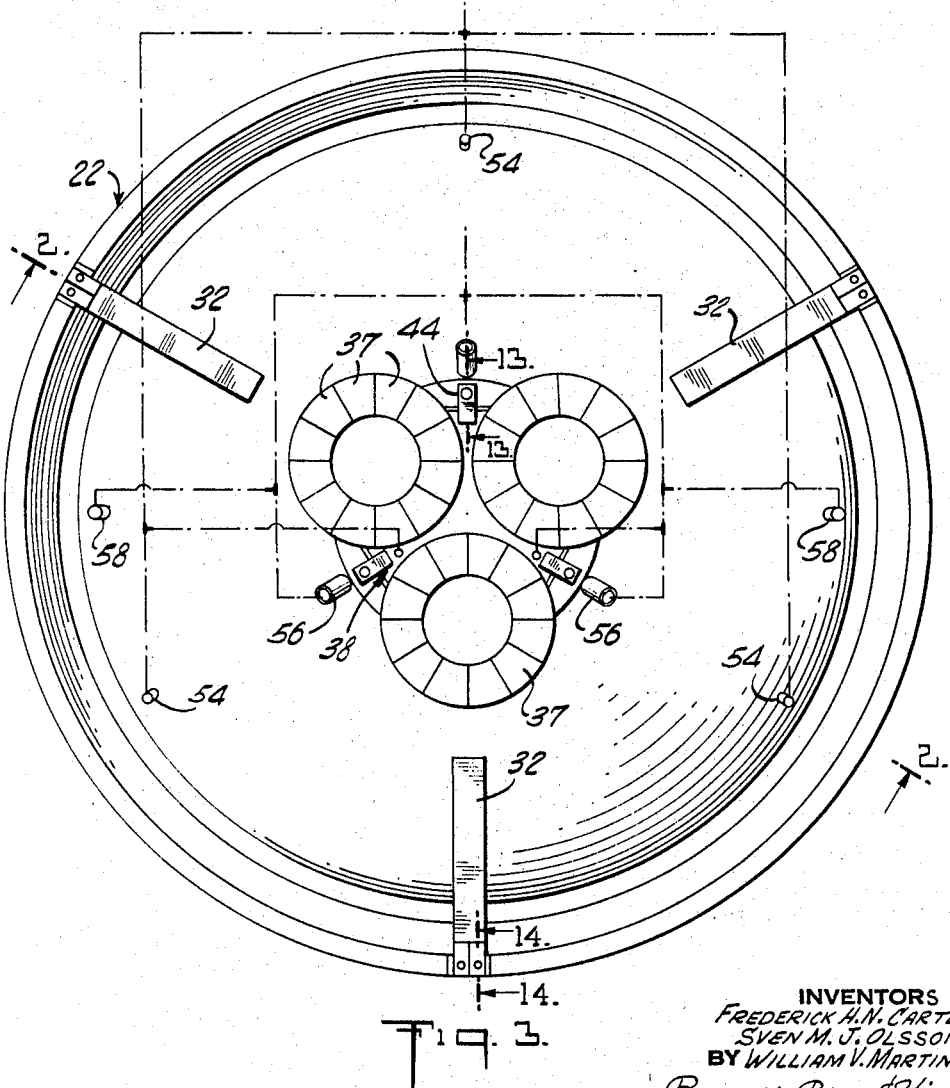

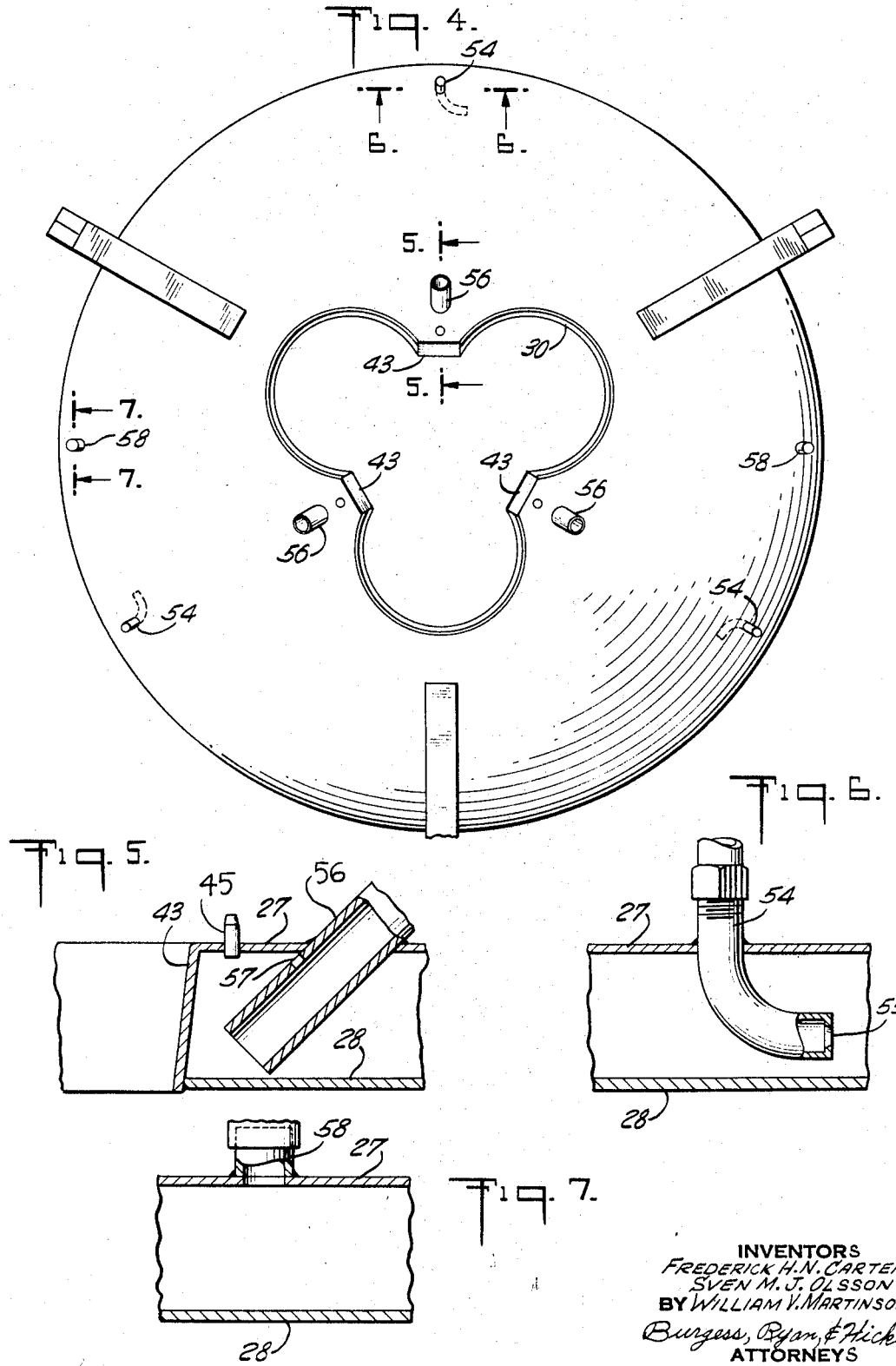

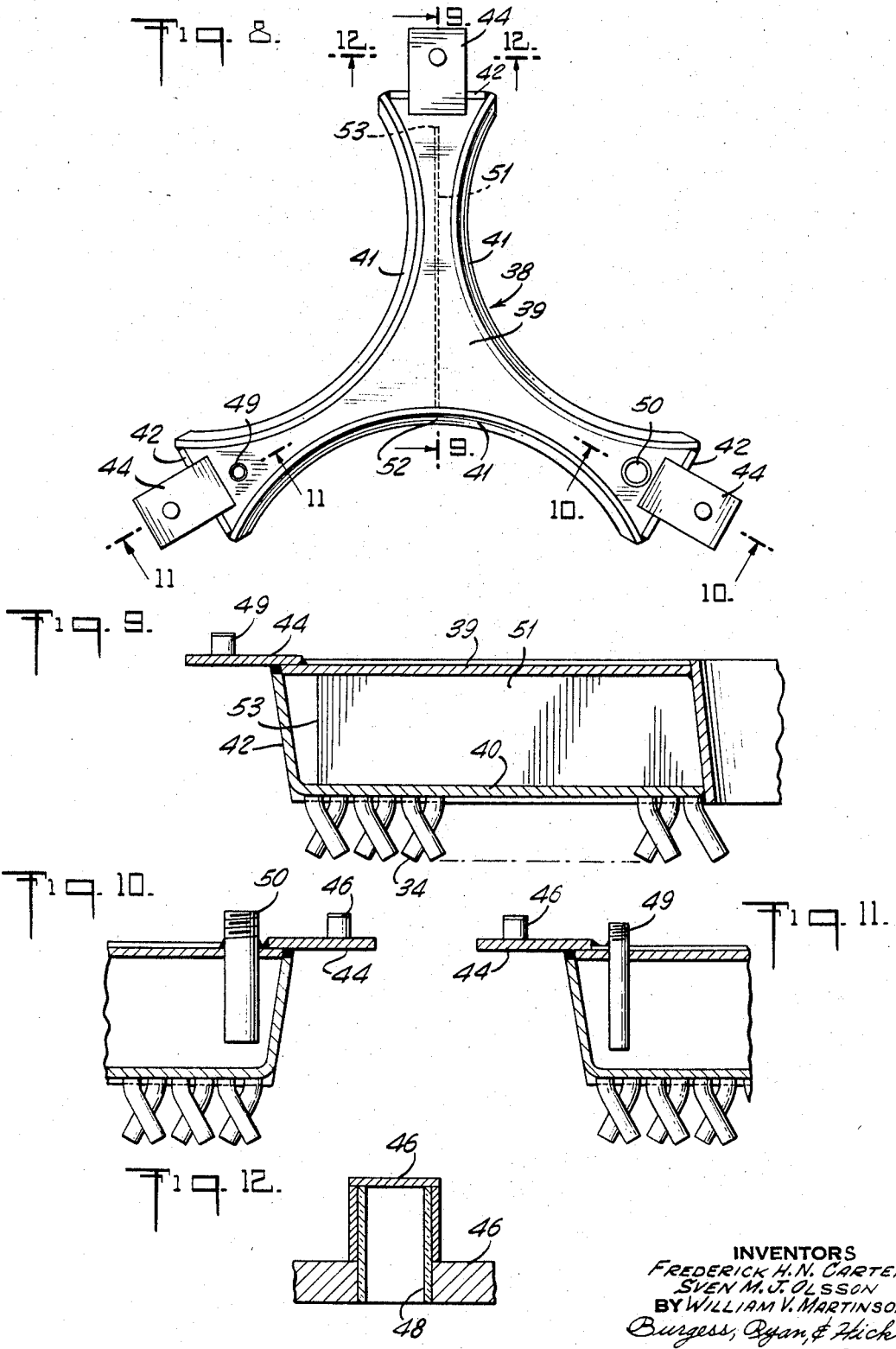

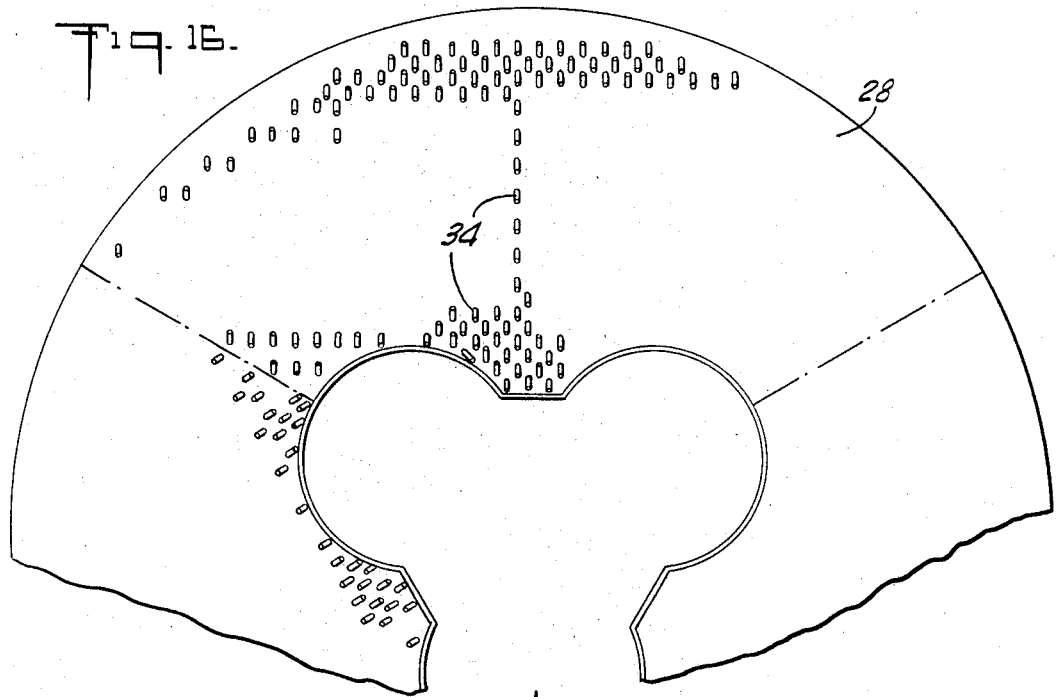
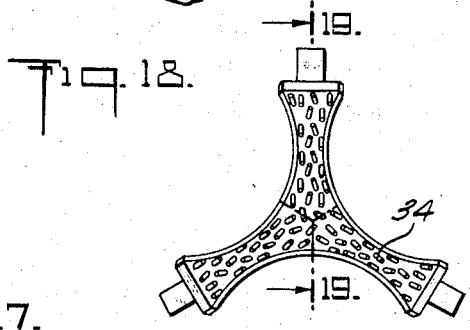
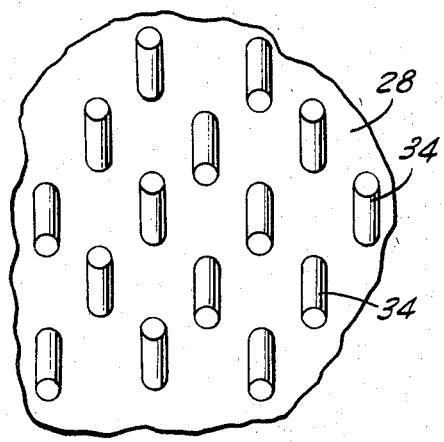
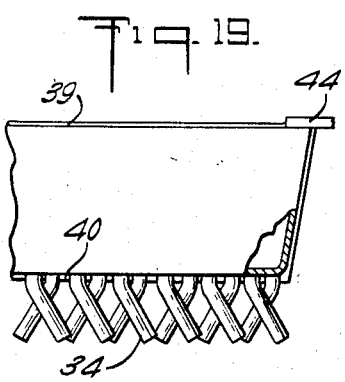

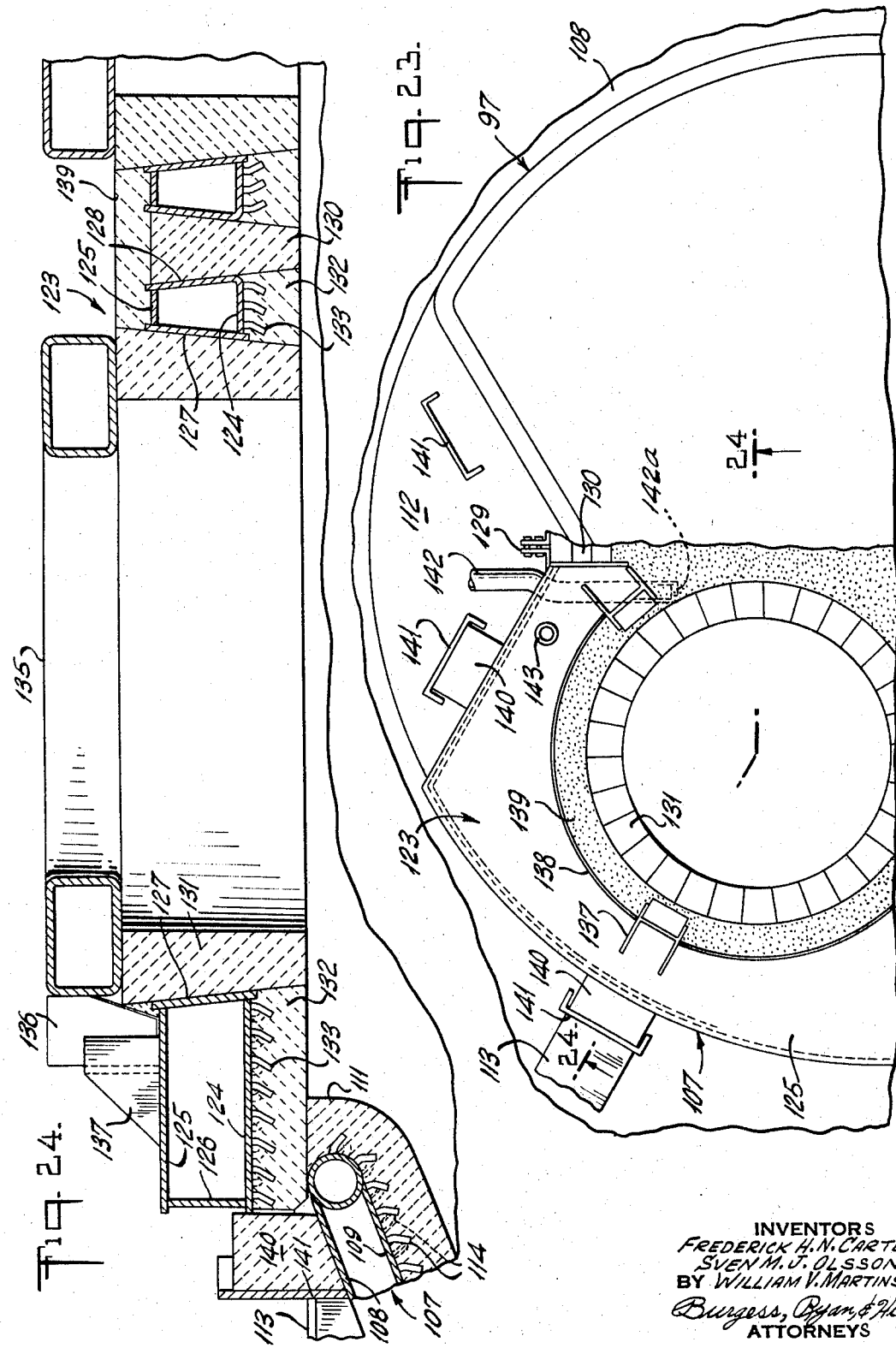

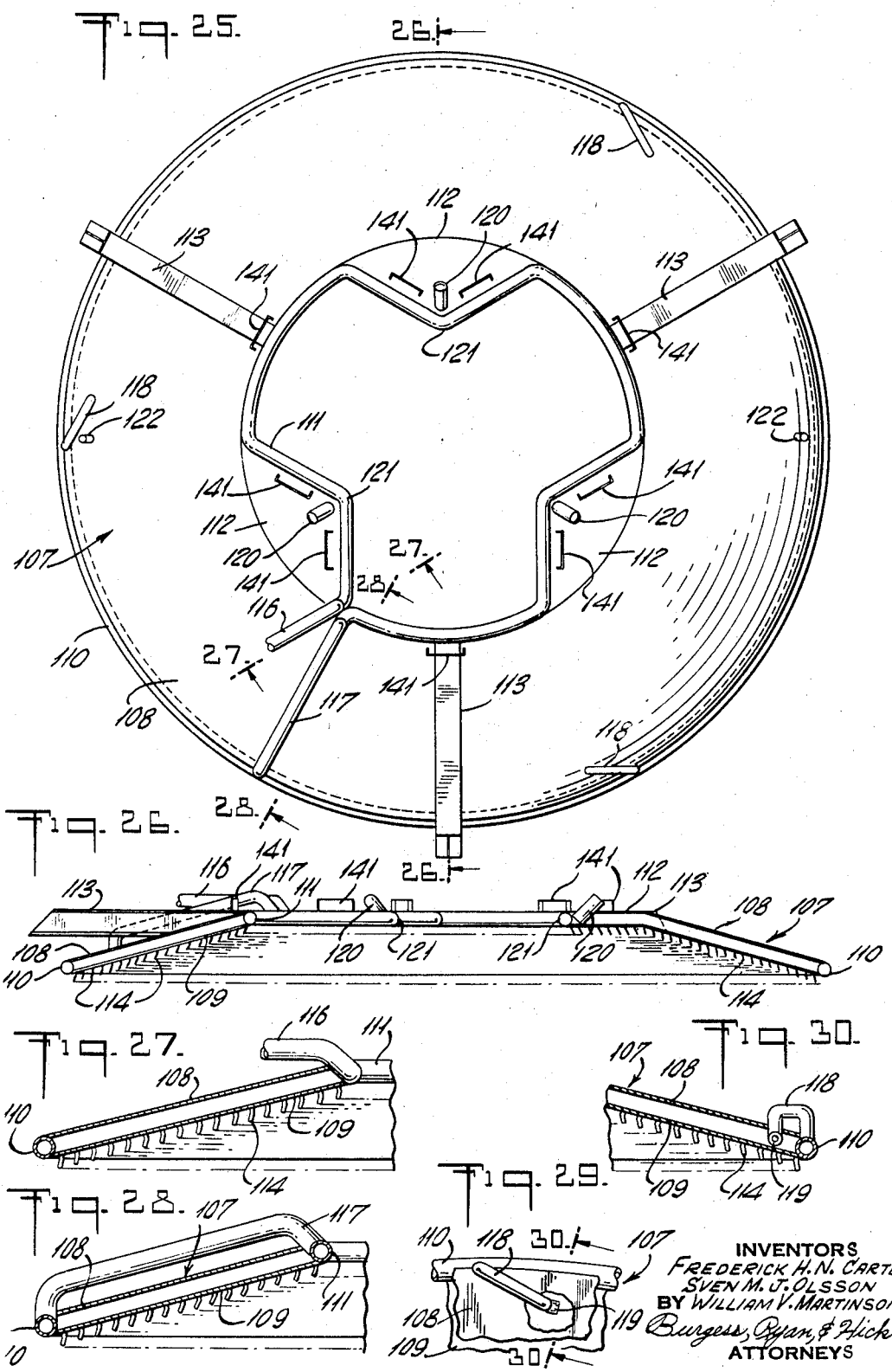

United States Patent Office 3,429,973
Patented Feb. 25, 1969

3,429,973
FURNACE CONSTRUCTION
Frederick H. N. Carter, 135 E. 54th St., New York, N.Y. 10022; William V. Martinson, 22 Russell Road, Dobbs Ferry, N.Y. 10522; and Sven M. J. Olsson, 18 Manor Road, Old Greenwich, Conn. 06870
Filed Sept. 2, 1965, Ser. No. 484,661
U.S. Cl. 13—9  21 Claims
Int. Cl. H05b 7/18; F23m 5/02, 5/08

ABSTRACT OF THE DISCLOSURE

A water-cooled roof structure for furnaces, such as electric arc furnaces, in which a refractory layer is suspended beneath a hollow, domed, circular metal shield and fluid inlets and outlets are located to form within the shield a relatively thin, wide annular body of cooling fluid rotating in vortex fashion about the center of the shield.

---

This invention relates to furnaces having a refractory lining which is protected from the furnace heat by a hollow metal backing structure adapted to hold the refractory lining and to receive a circulating cooling fluid. More particularly, it relates to a removable roof for an electric arc furnace, said roof comprising a hollow metal dome-shaped cover with means for supporting a refractory layer in contact with the underside of the cover and with means for circulating a cooling fluid through the cover.

Electric arc furnaces are constructed in the form of a large, refractory-lined container of circular cross-section. This container may be tilted about a horizontal axis in order to pour off the molten contents through apertures in its sides. The open top of the container is covered by a removable furnace roof. Heat is supplied to the furnace by three carbon electrodes which project vertically through the furnace roof down into the center of the container. When suitable three-phase alternating voltage is applied to the electrodes, a current flows between the material in the furnace and the electrodes, resulting in the formation of arcs which give off intense radiant heat. This radiation, together with the hot gases circulating in the furnace, heats not only the furnace charge but also the portions of the refracory lining which are above the level of the furnace contents, and gradually destroys them by melting and cracking. It is an object of this invention to increase the life of the refractory lining on the underside of the furnace roof by cooling the lining.

Refractory material is now available which may be applied to the underside of an electric arc furnace roof in a plastic state by ramming or gunning. Such refractory adheres poorly to a metal surface and has low structural strength, especially after it has been burned or fissured in use. It is an object of this invention to provide a backing or supporting roof structure which will hold the refractory in place and which may be cooled by a flow of water or other fluid.

Since the roof of an electric arc furnace must be frequently removed, it is an object of this invention to produce a roof structure which is comparatively light in weight but nevertheless resistant to damage during handling. It is a further object to produce a roof which is rigid, so that flexing of the roof during handling will be minimized, thus avoiding strain on the refractory layer.

It is also an object of the invention to produce a roof structure which may be inexpensively fabricated, and the embodiment disclosed achieves this result since it is built up from certain dome-like metal sheets or other members of a type readily available in commerce.

Hollow metal structures carrying a refractory lining are known in which a cooling fluid is circulated through meandering passages, formed, for instance, by suitably placed baffles, which passages have a length greatly exceeding their hydraulic diameter. Such passages may become vapor locked. For example, if a chunk of the underlying refractory drops out, a passage may be exposed to the full heat of the furnace, and local boiling may occur at the exposed segment. If a sufficient volume of vapor is produced, the result may be the formation of a vapor bubble effectively stopping flow through the passage. Since fluid is usually to several passages in parallel with each other, the result is that the cooling fluid bypasses the hot spot. Until flow is restored, the desired cooling of the refractory is prevented. It is an object of the invention to provide cooling passages of a shape not subject to vapor lock and one in which local boiling, if it does occur, will not shield the hot spot from further contact with the cooling fluid.

It is also an object of the invention to provide a plurality of fluid entrances and of fluid exits to the cooling passages, so arranged that accidental blocking of any one exit or entrance cannot deprive any portion of the roof of cooling fluid.

Furnace roofs of the type having long, thin cooling fluid passages depend on a constant flow of fluid from outside the roof to maintain flow through the cooling passages. Should the external supply be temporarily stopped, as by pump failure, the closing of a valve, or rupture of a supply hose, the flow immediately ceases. During this period of quiescence, local boiling may occur in the cooling passages, leading to vapor lock and overheating. This problem is particularly likely to arise where the fluid in the cooling passages is water at substantially atmospheric pressure, as is the case in many known structures. It is an object of the present invention to produce cooling passages in which the momentum of the moving cooling fluid will insure continued flow of the fluid over the surfaces to be cooled even if the inflow of the fluid to the roof is temporarily interrupted.

In existing furnace roofs of the type having a plurality of separate passages for the cooling fluid, it is a common expedient to provide each passage with a separate outlet pipe or hose, all of which discharge into an open drain. It is hoped by this arrangement to provide a visual indication to the operator that each passage is receiving a flow of cooling fluid. This precaution requires constant attention on the part of the operator for its effectiveness. It has been found that even with an alert operator it is not always possible to restore flow in a vapor-locked passage without removing the roof from the source of heat, a process which can result in a considerable delay in manufacture. It is an object of the invention to produce cooling passages of a shape not subject to vapor-lock, and thus avoid the delay just described, as well as the need for vigilant supervision of the fluid flow or pressurizing of the cooling fluid.

Further objects and advantages of the invention will be apparent from the following description, in which FIG. 1 is a piping diagram showing (in plan view) a furnace roof connected to a reservoir (in elevation);

FIG. 2 is a cross-sectional view taken on plane 2—2 of FIG. 3, showing in elevation the furnace roof and a portion of the furnace;

FIG. 3 is a plan view of the furnace roof in place on the furnace;

FIG. 4 is a plan view of the furnace roof with certain portions thereof removed;

FIG. 5 is a cross-sectional view taken on plane 5—5 of FIG. 4;

FIG. 6 is a cross-sectional view taken on plane 6—6 of FIG. 4;

FIG. 7 is a cross-sectional view taken on plane 7—7 of FIG. 4;

FIG. 8 is a plan view of a filler piece;

FIG. 9 is a cross-sectional view on plane 9—9 of FIG. 8;

FIG. 10 is a partial cross-section on plane 10—10 of FIG. 8;

FIG. 11 is a partial cross-section on plane 11—11 of FIG. 8;

FIG. 12 is a partial cross-section on plane 12—12 of FIG. 8;

FIG. 16 is a partial view of the underside of a metal shield;

FIG. 17 is an enlarged view of a portion of the metal shield shown in FIG. 16;

FIG. 18 is a view of the underside of a center filler piece;

FIG. 19 is an enlarged cross-section taken on plane 19—19 of FIG. 18;

FIG. 23 is a partial plan view of the embodiment of FIG. 20, showing the structure in the center of the roof;

FIG. 24 is a partial cross-section on plane 24—24 of FIG. 23;

FIG. 25 is a plan view of a hollow metal shield incorporated in the roof of FIG. 20;

FIG. 26 is a cross-section on plane 26—26 of FIG. 25;

FIG. 27 is a partial cross-section on plane 27—27 of FIG. 25;

FIG. 28 is a partial cross-section on plane 28—28 of FIG. 25.

FIG. 29 is a partial plan view of a nozzle structure employed in the embodiment of FIG. 25; and FIG. 30 is a partial cross-section on plane 30—30 of FIG. 29.

Figure 13:
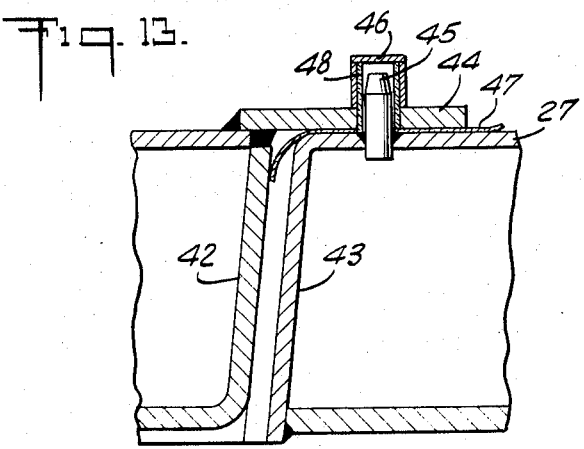
FIG. 13 is a partial cross-section on plane 13—13 of FIG. 3.

FIGS. 2 and 3 show portions of an electric arc furnace 19 having a metal shell 20 and a refractory lining 21. The upper edges of the metal shell 20 and the refractory lining 21 form a seat for the furnace roof 22.

As may best be seen in FIG. 2, the furnace roof comprises a hollow metal roof ring 23 having a sloping inner face 24 lined with roof ring refractory 25. The inner face 26 of the roof ring refractory is a portion of a conical surface and supports the central portion of the furnace roof. This portion is comprised of a dome-shaped metal upper plate 27 welded to the upper edge of peripheral wall 29, the latter being the upturned edge of a dome-shaped metal lower plate 28. A central opening in the furnace roof is bordered by an inner wall 30 (see FIGS. 2 and 4). The upper and lower plates, together with the peripheral wall and the inner wall, define a hollow shield 31 having an interior chamber which is a closed loop and which substantially fills the interior of the shield. In the embodiments shown, the furnace roof is round and the chamber is roughly annular in shape.

The hollow shield 31 is suspended in place over the open top of the furnace by horizontal struts 32 which are welded to the upper plate and which rest on the metal roof ring 22. Bolts 33 hold the struts to the roof ring during tilting of the furnace.

The underside of the lower plate 28 is covered with a plurality of regularly spaced downwardly projecting metal studs 34. These studs in the embodiment shown were originally cylindrical in shape. They were electrically butt welded to the lower plate in a direction perpendicular to the lower surface at the point of welding. After welding the studs were bent over as shown in FIGS. 13 through 16, to form adjacent rows inclined in opposite directions.

Covering the lower plate 28 and the attached studs is a layer of roof refractory 35. This material is rammed or gunned in place while the roof is off the furnace and in an inverted position. The studs are embedded in the roof refractory and serve both to hold it in place and to conduct heat therefrom to the hollow shield 31. During the assembly of the roof, a sealing ring 36 of refractory may be poured in place between the peripheral wall 29 and the inner face 26 of the roof ring refractory 25.

As may be seen in FIG. 3 the furnace roof is pierced by three vertical round holes, symmetrically placed around the center of the roof. These holes accommodate three cylindrical carbon electrodes (not shown) which introduce electrical energy into the furnace during use. Each hole is lined with a series of wedge-shaped refractory bricks 37 which are supported by the inner wall 30 and by a center filler piece (to be described below). As may be seen in FIGS. 2 and 4, the inner wall 30 has a tri-lobate shape and curved portions which are slightly inclined inward at the bottom, so that the weight of the refractory bricks serves to hold them in place by wedging action.

The space between the electrode holes is closed by the center filler piece 38 (see FIGS. 3 and 8). The center filler piece is comprised of a top plate 39 and a bottom plate 40. These are spaced from each other, and connected by three symmetrically spaced concave side walls 41 and three end walls 42. The side and end walls, together with the top and bottom plates, form a hollow chamber adapted to receive a circulating cooling fluid. The concave side walls 41 slope downward and inward toward the center of curvature of these walls, as does the inner wall 30 (FIG. 4), and are proportioned so as to afford a continuation of the curved portions of the inner wall 30. When the center filler piece is in place, as shown in FIG. 3, it defines with the inner wall 30 the necessary conical openings for the refractory bricks 37.

Portions of inner wall 30 are flat and slope inward and downward. These may be called cusp portions 43 as they lie between the curved lobes of the central opening in the inner wall. When the center filler piece is in place, the cusp portions closely approach the end walls 42 (FIG. 13). The center filler piece is held in place by tabs 44 which are welded to the top plate 39 and project over the upper plate 27 in the vicinity of the cusp portions 43. As may best be seen in FIG. 13, each tab 44 has a vertical opening which fits over a vertically extending locating pin 45 welded to the upper plate 27. A metal cap 46 welded to the tab 44 covers the end of the locating pin when the center filler piece is in place.

It is desirable to electrically insulate the center filler piece 38 and the roof ring 23 from the hollow shield 31 in order to reduce the intensity of the stray electric currents induced in the structure during operation of the furnace. For this purpose an insulating sheet 47 is interposed between the tab 44 and the upper plate 27. Insulation of the locating pin is achieved by a sleeve 48 of insulating material which surrounds the locating pin and spaces it from the tab 44 and the cap 46.

Figure 14:
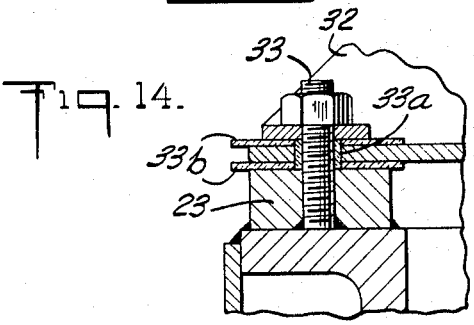
FIG. 14 is a partial cross-section on plane 14—14 of FIG. 3.

The struts 32 are insulated from the roof ring 23 as shown in FIG. 14. The struts may advantageously be I-beams, having a central web and flanges, the lower of which is pierced to receive bolts 33. Each bolt is insulated from contact with the flange by an insulating sleeve 33a and two insulating washers 33b.

Cooling of the roof is effected by a flow of fluid, such as water, through the hollow center filler piece and the hollow shield 31. A filler piece inlet 49 is adapted to receive cooling fluid from a source to be described below. A filler piece outlet 50 provides an exit for cooling fluid which has passed through the center filler piece. In order that all three legs of the center filler piece may receive a flow of fluid, an internal baffle 51 is provided. This baffle reaches from the top plate 39 to the bottom plate 40, and abuts the side wall 41 at point 52. A free edge 53 of the baffle is spaced from the adjacent end wall 42. This construction forces cooling fluid to flow from the filler piece inlet along the baffle to free edge 53, around the free edge, and along the other side of the baffle to the filler piece outlet 50.

Cooling fluid is introduced into the hollow shield 31 through three entrance pipes 54. These pierce the upper plate at points near the peripheral wall 29 and are spaced at 120° intervals around the furnace roof. Each entrance pipe has a nozzle 55 (see FIG. 6) which directs the entering stream of fluid in a direction which is horizontal and perpendicular to the radius from the center of the furnace roof to the nozzle. All three nozzles are so inclined that they all direct their flow in the same direction about the central vertical axis of the roof, clockwise as seen in FIG. 4. The tangential velocity component thus imparted to the entering fluid produces a rotational or vortex motion of the fluid within the annular loop of the hollow shield 31. This motion is increased as a result of the placement of exit pipes 56 near the inner wall of the hollow shield, since it is well known that fluid which has a rotational velocity component about a point will increase in angular velocity as it is drawn inward toward that point. Thus, the mass of cooling fluid within the hollow shield is maintained in rapid circulation through the shield, an effect that will persist for some time even if flow through all of the nozzles is stopped. The vortex or rotational motion within the hollow shield also cooperates with the dome-like shape of the shield to bring the warmest cooling fluid to the exit pipes 56. As a small mass of fluid rises in temperature it expands and its density decreases. The centrifugal forces within the mass of rotating fluid tend to throw the most dense (and therefore coolest) fluid to the outside of the annular chamber, and the warmer fluid is displaced inward toward the exit pipes. In addition, since the warmest fluid tends to rise, by convection, it will seek the high points in the domed annular chamber, and these also are located in the vicinity of the exit pipes.

It will be appreciated that the rapid vortex motion of the fluid within the hollow shield will prevent stagnation of the fluid at any point. This in turn will prevent a hot spot from causing the formation of a vapor film which could cut off a portion of the lower plate from contact with the cooling fluid. It will also be seen that there is redundancy in the system, in that new fluid will continue to be supplied to all parts of the hollow shield as long as at least one entrance pipe and one exit pipe remain free of obstruction.

As has been mentioned, the cooling fluid finds its principal exit through pipes 56. It is contemplated that some cooling, vapor formation, or evolution of dissolved gases may occur within hollow shield 31, and this possibility requires both the provision of the entrainment apertures 57 in the exit pipes and of the auxiliary exit pipes 58. As may be seen in FIG. 5, the exit pipe 56 projects downward through the upper plate 27 almost to the lower plate 28. Vapor or gas within the hollow shield 31 could become trapped above the lower end of the exit pipe, since the space above the lower end is the highest point in the annular chamber when the furnace roof is in a level position. To prevent this an entrainment aperture 57 is provided through the side of the exit pipe just below the point at which the exit pipe pierces the upper plate. Gases reaching this point are sucked into the exit pipe through the entrainment aperture and thus removed from the hollow shield.

The furnace roof shown in FIG. 3 is designed to be used on a tilting furnace, the axis of tilting running from the bottom to the top of the drawing. When so tilted, the uppermost part of the hollow shield 31 will no longer be that portion adjacent the exit pipes 56. Instead, one or the other of the auxiliary exit pipes 58 will connect with the high point within the hollow shield where gas or vapor may be expected to accumulate. The gas or vapor will be removed through the auxiliary exit pipes by the piping system to be described below. The auxiliary exit pipes are considerably smaller in diameter than are exit pipes 56, so that the exit pipes remove only a small fraction of the cooling fluid that enters the hollow shield.

FIG. 1 shows the arrangement of valves, pumps, ducts, and a storage reservoir which provides cooling fluid to the furnace roof. Cooling fluid enters the system by pipe 59, passing normally through valves 60, 61 and 62. Valve 61 is a thermostatically controlled valve, the operation of which is explained below. A bypass valve 63 allows manual control of the inflow, bypassing the thermostatically controlled valve 61. Having passed through the valves just described, cooling fluid enters reservoir 64 through pipe 65, where it is projected upward against a horizontal baffle 66 by diffuser 67. Fluid is withdrawn from the reservoir by pipe 68 having an intake 69 located above the baffle. A pair of pumps 70 driven by electric motors 71, and having intake and outlet valves 72 and 73 are connected in parallel to pipe 68. These pumps deliver fluid to supply pipe 74. The supply pipe extends to a point close to the furnace roof, where it joins a flexible supply hose 75. The supply hose conducts the cooling fluid to a pipe 76 which is attached to the furnace roof and moves with it. This pipe in turn delivers fluid to inlet manifold pipe 77 which extends around the periphery of the furnace roof. A header 78 leads from the manifold to each entrance pipe 54 and a header 79 similarly leads from the manifold to the center filler piece inlet 49.

Fluid that has passed through the furnace roof leaves through headers 80 which extend from the exit pipes 56 to an outlet manifold pipe 81. Headers 82 connect the auxiliary exit pipes 58 to the outlet manifold pipe. Flow from the filler piece outlet 50 is also conducted to the outlet manifold pipe by a header 83.

All the used cooling fluid passes from the outlet manifold pipe to a single pipe 84 which is rigidly attached to the furnace roof. Headers 80, 82 and 83, and the outlet manifold pipe 81 are so slanted that fluid therein either flows horizontally or flows upward as it moves toward the junction between the outlet manifold pipe and pipe 84. This construction prevents vapor lock in these pipes, a condition that may otherwise arise where two or more pipes are connected in parallel so that all the flow might occur in one pipe.

Pipe 84 on the furnace roof is connected to pipe 85 by flexible hose 86. Flexible hoses 75 and 86 provide a continuous flow of cooling fluid even when the furnace is being tipped.

Pipe 85 carries warmed cooling fluid from the vicinity of the furnace to the reservoir 64, where it passes through diffuser 87 to the surface of the reserve fluid 88. The level of fluid in the reservoir is maintained constant by means of an overflow pipe 89.

The supply of cooling fluid is regulated by thermostatically controlled valve 61. The thermostat measures the temperature of the fluid flowing in pipe 85 and opens valve 61 when it reaches a predetermined temperature, thus admitting cold fluid into the reservoir. This connection is indicated scehmatically by dashed line 90. The reservoir itself holds a supply of fluid which may be used to cool the furnace roof even if the inflow of fluid through pipe 59 is interrupted.

Figure 15:
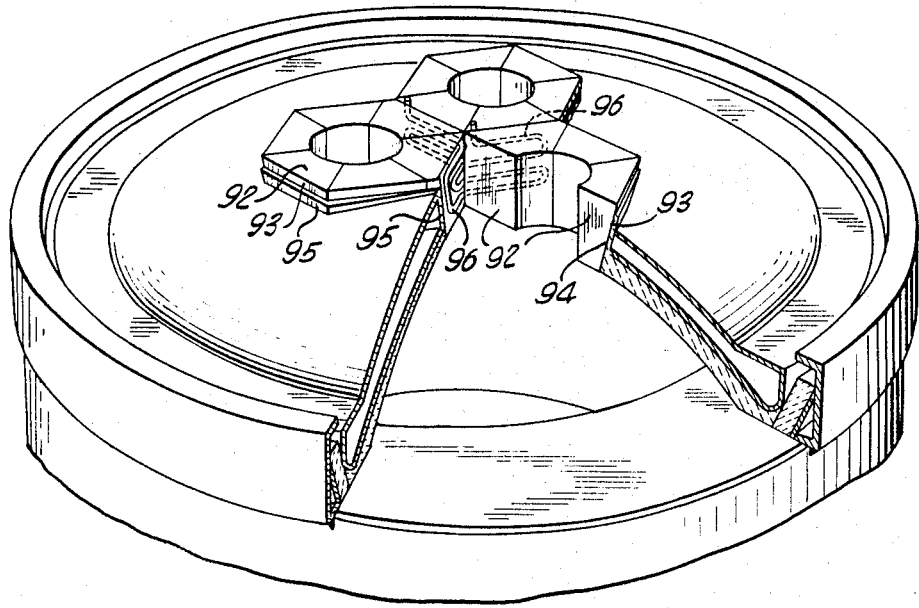
FIG. 15 is a perspective view, in partial section of a first alternative furnace roof structure.

FIG. 15 shows a second embodiment of the invention which omits the hollow center filler piece. As shown in FIG. 15 each vertical electrode hole is lined with six wedge-shaped refractory blocks 92, making a plug of hexagonal outer cross-section with outer walls 93 sloping somewhat inward and downward. The inner wall 94 is comprised of twelve flat plates 95, sloping to conform to the outer walls 93 of the refractory blocks. The portions of the hexagonal plugs which abut each other are cooled by means of a meandering pipe 96 which traverses the joint between them. In other respects the furnace roof of FIG. 15 is similar in structure to that of FIGS. 2 and 3, and most of the structural details have consequently been omitted from FIG. 15.

Furnace roofs of the type described may be economically constructed from dome-like metal sheets which have been spun-formed to serve as tank ends. These are commercially available in a variety of sizes and shapes. Such a spun metal plate forms upper plate 27 of FIG. 2, while another integral spun-metal tank end forms the lower plate 28 and the peripheral side wall 29. After the required central openings have been cut in these plates, they are welded together to form the hollow shield 31 as shown. This construction avoids a welded seam at the joint between the peripheral wall and the lower plate. A weld at this location would be undesirable as this joint is subject to considerable stress due to unequal thermal expansion of the upper and lower plates.

A third embodiment of the invention is shown in FIGS. 20 to 30. As may best be seen in FIGS. 20 and 21, the furnace roof 97 is bounded by a circular metal roof ring 98 having a flat annular bottom surface 99. This bottom surface is intended to rest upon the upper surface of the refractory lining of the side walls of an electric arc furnace like that shown in FIG. 2. A peripheral band 100 encircles the roof ring and forms, together with surfaces 101 and 102 on the roof ring, a closed annular cooling chamber. A flow of cooling fluid through this chamber may be promoted by connecting suitable hoses to inlet 103 and outlet 104.

Abutting the inner face 105 of the roof ring is a layer of roof ring refractory 106 which may comprise a ring of refractory bricks. The roof ring refractory in turn abuts a hollow metal shield 107. The shield is formed of upper plate 108 and lower plate 109, both of conical shape. The upper and lower plates are spaced from each other and connected at their outer peripheries by an outer feed ring 110 of metal pipe, to which they are welded. Similarly, the inner peripheries of the upper and lower plates are welded to an inner feed ring 111. As may be seen in FIGS. 25 and 26, the generally conical shape of the hollow shield is flattened at its central portions to produce three symmetrically spaced platforms 112. Since the upper and lower plates are ruled surfaces, not double curved surfaces, they may be bent from flat metal sheets.

The hollow shield is held in place by three struts 113 which are welded to the hollow shield and which have projecting ends bolted to the roof ring 98. The structure of the struts and their means of attachment is similar to that described in connection with struts 32.

The underside of the lower plate 109 is covered with rows of bent-over studs 114 and shielded from the direct heat of the furnace by rammed or gunned roof refractory 115.

Figure 20:
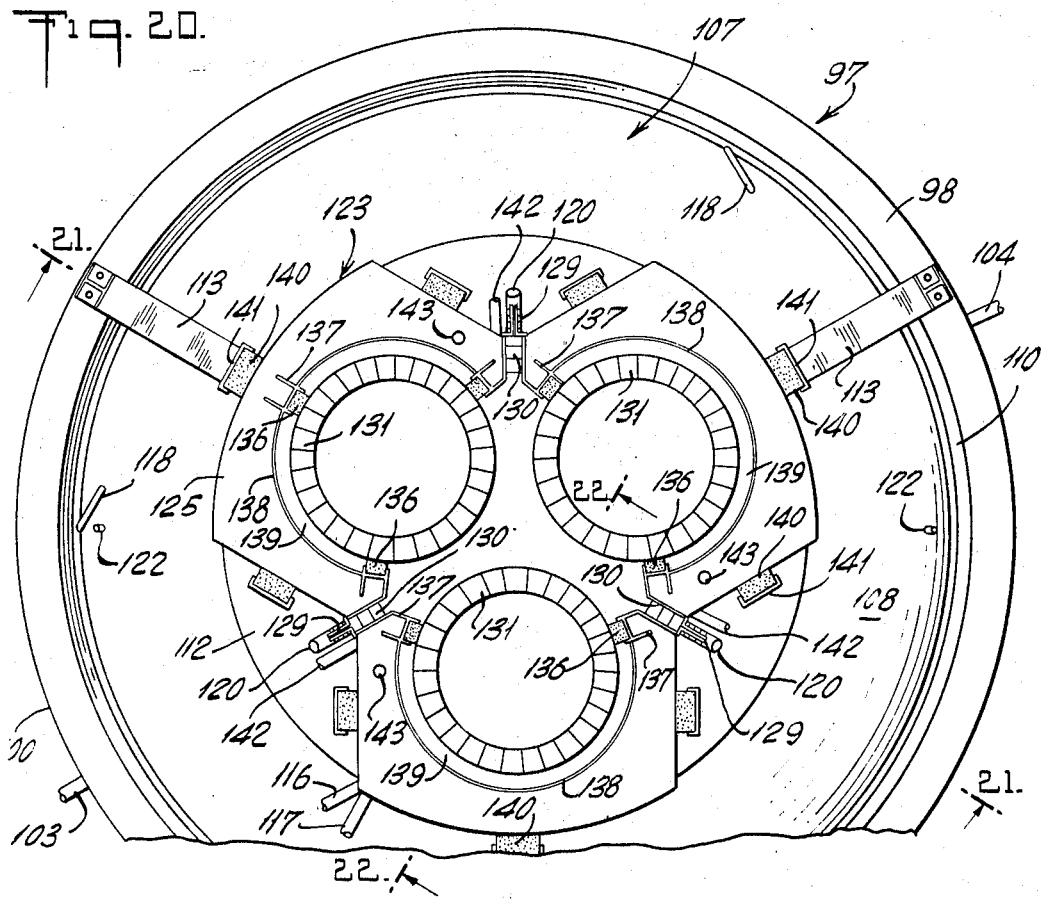
FIG. 20 is a plan view of a portion of a second alternative furnace roof construction.
Figure 21:
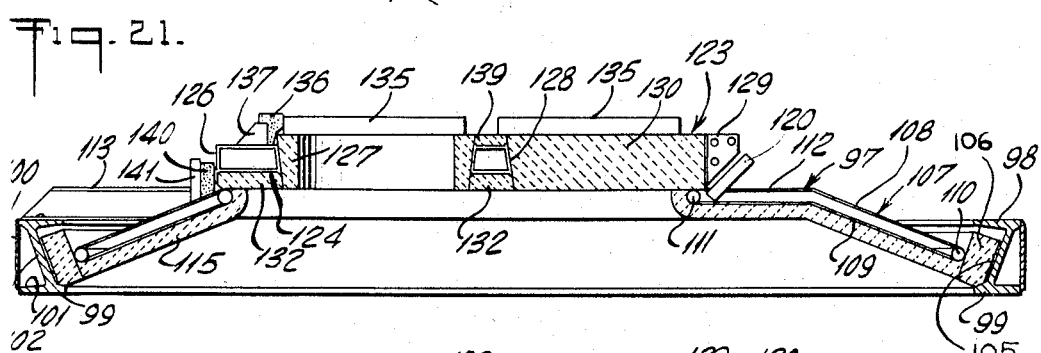
FIG. 21 is a cross-section on plane 21—21 of FIG. 20.
Figure 22:
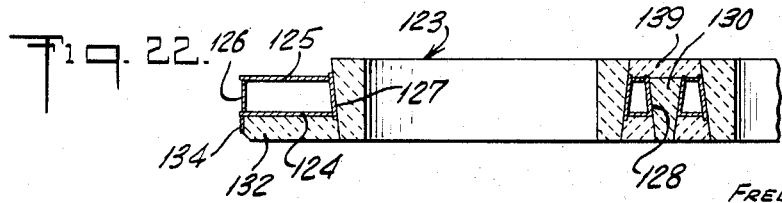
FIG. 22 is a partial cross-section on plane 22—22 of FIG. 20.

Cooling fluid for the hollow shield of FIG. 20 is introduced by a flexible hose (not shown) into inlet pipe 116 which carries it to the inner feed ring 111. After passing around the inner periphery of the hollow shield in the inner feed ring, the fluid is lead by connector 117 to the outer feed ring 110. From the outer feed ring the cooling fluid flows through three symmetrically spaced feeder pipes 118 (one of which is diametrically opposed to connector 117) which enter the hollow shield through the upper plate. These pipes terminate in nozzles 119, which are similar in construction and orientation to nozzles 55 shown in FIG. 6. The fluid from the nozzles 119 receives a whirling or vortex motion within the hollow shield, and is removed from outlet pipes 120 which project upward from the hollow shield at the cusp portions 121 of the platforms 112. Two auxiliary exit pipes 122 are diametrically disposed at the edge of the hollow shield. The details of the piping connecting the roof to the fluid supply are similar to those of the roof of FIG. 2, and need not be repeated.

The tri-lobate central opening in the furnace roof 97 is covered by center filler piece 123. The center filler piece is comprised of three metal chambers adapted to receive a flow of cooling fluid. The chambers are bolted together, but are electrically insulated from each other, and are shielded from the direct heat of the furnace by layers of refractory.

Each chamber has a bottom plate 124 and a top plate 125. The top and bottom plates are connected by outer wall 126, which extends between their outer peripheries, and inner wall 127 which joins their inner peripheries. The outer wall is vertical except for interior portions 128, which slope down and out to form part of a downwardly narrowing slot between adjacent chambers of the filler piece. Brackets 129 are welded to the outer walls 126 and receive bolts which clamp the chambers together. A layer of insulation between abutting brackets prevents electrical contact between the chambers. The gap between the opposed interior portions of the outer walls is filled by a row of wedge-shaped refractory bricks 130.

The inner wall 128 of each chamber is a portion of a conical surface having an apex located beneath the roof. The circular openings thus defined through the chambers are lined with a layer of refractory bricks 131 which form a collar around the cylindrical vertical electrodes (not shown) when the roof is in use. The outer surface of the collar conforms to the inner wall 127 and the collar is supported by the consequent wedging fit. As may best be seen in FIG. 24, the center filler piece is further insulated by a layer of gunned refractory 132 held in place by rows of bent-over studs 133 which are welded to the underside of bottom plate 124. A depending metal skirt 134 serves to contain the gunned refractory and to protect it during assembly of the furnace roof.

FIG. 24 shows the center filler piece combined with a hollow annular metal sealing ring 135 (not shown in FIG. 23). The sealing ring is held in position by refractory brick chocks 136 which fit into vertical slideways 137 welded to top plate 125. A cooling fluid may be circulated within the sealing ring.

Upstanding metal dams 138 are welded to top plate 125 and to the slideways 137 and extended around the openings in the center filler piece. Refractory material may be rammed or gunned into the resulting annular spaces delimited by these dams on the outside and by the refractory bricks 131 on the inside to form a sealing layer 139.

The assembled filler piece is held in position by chocks 140 of refractory brick. These are braced by metal channels 141 welded to the upper plate 108. The gunned refractory 132 rests on the inner feed ring 111 and makes a seal therewith.

Cooling fluid is introduced into the three chambers of the center filler piece through inlet pipe 142 and nozzle 142a. The cooling fluid, after circling the hollow chamber, leaves through exit pipe 143.

The furnace roof shown in FIG. 20 is divided into a number of parts, each of which is electrically insulated from the others in order to reduce the energy losses occasioned by currents induced in the roof structure. Thus each of the three hollow chambers which comprise the center filler piece is electrically isolated from the other hollow chambers and from the hollow shield 107. The latter element is in turn electrically isolated from roof ring 98.

The structures illustrated are light in weight and rigid. The expense of fabricating large numbers of cooling tubes has been avoided, as has the risk of leakage inherent in water-cooled roofs having many pipe joints and bends. In furnace roofs having a large number of meandering tubes to contain the cooling fluid it is necessary to provide a strong separate frame to support the weight of these tubes and of the refractory adhering to them. In the present invention the function of structural support and of holding the cooling fluid is combined in the hollow metal shield. The domed shape of the shield adds to the load-bearing capacity thereof and, in addition, allows a certain amount of upward flexing of the center as the roof is heated. This relieves some of the outward force that might be exerted against the roof ring refractory 25 by a flat hollow chamber.

The following is claimed:

1. A furnace roof for capping the open top of a furnace, said roof comprising a shield of heat conducting material substantially coextensive with the roof, interior surfaces in the shield defining a chamber therein, the chamber being substantially coextensive with the shield and sloping upward toward the center from its outer periphery, first means for conducting a fluid cooling medium into the chamber adjacent the outer periphery thereof said first means comprising a plurality of nozzles projecting through the shield into the chamber and pointing in a direction substantially in the plane of the furnace roof and substantially perpendicularly to an imaginary line between the nozzle and the center of the roof, and second means for removing the fluid cooling medium from the chamber adjacent the center thereof, said second means comprising an outlet pipe passing through the shield from the chamber at a point close to the most central part of said chamber.

2. The furnace roof of claim 1, comprising a layer of refractory material completely covering the underside of the shield.

3. The furnace roof of claim 2, comprising a plurality of fastening members extending from the shield into the layer of refractory material.

4. The furnace roof of claim 3, wherein the fastening members comprise heat-conducting studs projecting from the shield into the refractory material which completely surrounds said studs.

5. The furnace roof of claim 1, wherein the means for conducting the fluid cooling medium into and out of the chamber comprises a plurality of outlets from the shield and an individual fluid passage from each outlet to a common exit passage, each individual fluid passage progressing toward the common exit passage without dipping, whereby no siphon portions exist in the individual fluid passages.

6. A furnace roof for capping the open top of a furnace, said roof comprising a metal shield adapted to extend over the major portion of the open top and having interior surfaces defining an annular chamber in the shield, said annular chamber being substantially coextensive with the metal shield and being of a height small in proportion to its breadth, a plurality of inlets communicating with the chamber from a point outside the metal shield, an outlet communicating with the chamber from a point outside the metal shield, nozzle means connected to each inlet protruding into the chamber for directing a stream of fluid from the inlet into the chamber in a direction substantially in the plane of the furnace roof and substantially perpendicular to an imaginary line drawn from the nozzle means to the approximate center of the annular chamber, whereby circulation of a fluid around the center of the annular chamber is effected.

7. The furnace roof of claim 6, comprising an insulating layer of refractory material covering the underside of the metal shield.

8. The furnace roof of claim 6, adapted for use in both a horizontal position and a tilted position, said roof comprising an outlet communicating with the chamber at the location in the chamber which is uppermost when the roof is in the tilted position.

9. A furnace roof for capping the open top of an electric furnace comprising:

(a) a metal dome-shaped lower plate of circular outer periphery adapted to extend over the open top of the furnace;
(b) a dome-shaped upper plate located above and spaced from the lower plate;
(c) a pheripheral wall joining the peripheries of the upper and lower plates;
(d) edge surfaces defining a central opening in the upper and lower plates;
(e) an inner wall joining the edge surfaces on the upper and lower plates, said inner wall defining, together with the peripheral wall and the upper and lower plates, a chamber of substantially annular shape;
(f) inlet means for conducting a cooling fluid from a point outside the furnace roof into the chamber;
(g) and outlet means for conducting a cooling fluid from the chamber to a point outside the roof.

10. The furnace roof of claim 9, wherein the inner wall defines a tri-lobate opening.

11. The furnace roof of claim 10, wherein the inlet means comprises at least one inlet pipe penetrating into the chamber through the upper plate and having an exit at a point adjacent the peripheral wall, said inlet pipe having an exit flow direction oblique to an imaginary line between the inlet pipe and the axial center of the chamber.

12. The furnace roof of claim 10, wherein the outlet means comprises an outlet pipe having an intake adjacent the inner wall in a cusp between two lobes of the tri-lobate opening.

13. The furnace roof of claim 10, wherein the outlet means comprises three outlet pipes, each outlet pipe having an intake adjacent the inner wall in a different cusp between the lobes of the tri-lobate opening.

14. The furnace roof of claim 10, comprising a center filler piece, said center filler piece having three concave side walls and three end walls, each end wall extending between two adjacent side walls, the end walls being adapted to abut the cusps between the lobes of the tri-lobate opening, and each concave side wall defining, with one lobe of the tri-lobate opening, a circular aperture through the furnace roof adapted to receive an electrode.

15. A center filler piece for an electric furnace roof, said roof being of the type adapted to receive three vertical electrodes in a tri-lobate central opening, said center filler piece comprising:

(a) three symmetrically spaced concave side walls, each said side wall being located to partially encircle an electrode at a desired spacing therefrom when the electrode is in place;
(b) end walls connecting the side walls;
(c) a top plate having a periphery joined to top edges of the side walls and end walls;
(d) a bottom plate having a periphery joined to bottom edges of the side walls and end walls, said top plate, bottom plate, side walls, and end walls defining a three-legged interior chamber; and
(e) means for circulating a cooling fluid through the interior chamber.

16. The center filler piece of claim 15, wherein the means for circulating the cooling fluid comprises (f) an inlet opening into a first leg of the interior chamber adjacent the end wall thereof;
(g) an outlet opening into a second leg of the interior chamber adjacent the end wall thereof; and
(h) a baffle extending between the top and bottom plates, one end of the baffle being joined to the concave side walls common to the first and second legs of the interior chamber and the other end of the baffle being spaced from the end wall in the third leg of the interior chamber, thereby defining a fluid passage through the interior chamber, the fluid passage extending from the inlet inwardly through the first leg to the baffle, along one side of the baffle outwardly through the third leg along the other side of the baffle, and outwardly through the second leg to the outlet.

17. The center filler piece of claim 16, comprising insulating suspension means at the end of each leg for holding the filler piece in place between the electrodes and out of electrical contact with the rest of the furnace roof.

18. The center filler piece of claim 15, wherein the concave side walls are a portion of a conical surface, the conical surface having an imaginary vertical axis and an imaginary apex below the furnace roof.

19. An electric arc furnace roof adapted for use with an electric arc furnace, said furnace having a furnace roof seat defined by the upper edge of a side wall of the furnace and said furnace having three cylindrical vertical electrodes projecting down into the furnace with their axes equidistant from each other, said furnace roof comprising:

(a) a metal roof ring adapted to seat upon the furnace roof seat;
(b) roof ring refractory lining the inside of the roof ring and having an inner surface slanting inward and downward when the furnace roof is in use;
(c) a dome-shaped metal lower plate arching over the furnace when the furnace roof is in place, said lower plate abutting the inner surface of the roof ring refractory;
(d) a dome-shaped metal upper plate arching over the furnace when the furnace roof is in place, said upper plate being located above, and spaced from, the lower plate;
(e) a peripheral wall extending between the upper and lower plates at the peripheries thereof;
(f) an inner wall defining, with the peripheral wall and the upper and lower plates, a hollow metal shield with an annular interior chamber, said inner wall extending between the upper and lower plates and defining a central opening through said plates, said opening being tri-lobate in form, with the center of each lobe adapted to coincide with the center of an electrode when the furnace roof is in use, with the portions of the inner wall which define a lobe sloping downwardly and inwardly toward the center of the lobe, and with portions of the inner wall between the lobes defining cusps;
(g) a layer of refractory covering the underside of the lower plate;
(h) a plurality of studs projecting from the lower plate into the layer of refractory;
(i) struts extending between the metal shield and the roof ring;
(j) means for electrically insulating the metal shield from the roof ring;
(k) a center filler piece bottom plate;
(l) a center filler piece top plate spaced from and located above the center filler piece bottom plate;
(m) three center filler piece end walls, each extending between the center filler piece top and bottom plates, and each so placed as to oppose a cusp of the metal shield;
(n) three center filler piece side walls defining, with the center filler piece end walls and the center filler piece top and bottom plates, a hollow three-armed center filler piece, each center filler piece side wall being concave and sloping downward and inward toward the center of a lobe of the metal shield, each said center filler piece side wall being alined with a portion of the inner wall which defines a lobe and each said center filler piece side wall defining, with said portion, an aperture;
(o) a refractory lining within each aperture defining a vertical electrode-receiving passage;
(p) a layer of filler piece refractory covering the underside of the center filler piece bottom plate;
(q) a plurality of studs projecting from the center filler piece bottom plate into the filler piece refractory;
(r) tabs extending between the center filler piece and the metal shield;
(s) means for electrically insulating the metal shield from the center filler piece;
(t) means for circulating a cooling fluid through the center filler piece; and
(u) means for circulating a cooling fluid through the annular interior chamber of the metal shield.

20. The furnace roof of claim 19, wherein the means for circulating a cooling fluid through the annular interior chamber of the hollow shield comprises a nozzle projecting into the annular interior chamber adjacent the peripheral wall and having a bore direction oblique to an imaginary line from the nozzle to the center of the metal shield, said nozzle being adapted to introduce cooling fluid with a rotational velocity component around the center of the metal shield.

21. The furnace roof of claim 20, wherein the means for circulating cooling fluid through the annular interior chamber of the hollow metal shield comprises an outlet passage through the metal shield, said outlet passage having an intake adjacent the inner wall.

References Cited
UNITED STATES PATENTS

| | | | |
|---|---|---|---|
| 2,548,485 | 4/1951 | Lubbock | 263—44 |
| 1,552,143 | 9/1925 | Gray | 13—9 |
| 2,222,004 | 11/1940 | Smith | 13—32 |
| 2,215,532 | 9/1940 | Richardson | 122—6 XR |
| 2,648,714 | 8/1953 | Williams et al. | 13—32 XR |
| 2,766,736 | 10/1956 | Del-Buono | 13—9 XR |
| 2,871,533 | 2/1959 | Swainson. | |
| 3,247,829 | 4/1966 | Morton | 122—6 |

BERNARD A. GILHEANY, *Primary Examiner.*

HIRAM B. GIBSON, *Assistant Examiner.*

U.S. Cl. X.R.

13—32; 110—99; 263—44